(12) United States Patent
Woo

(10) Patent No.: US 11,823,468 B2
(45) Date of Patent: Nov. 21, 2023

(54) DRIVER STATE WARNING SYSTEM AND METHOD OF MONITORING DRIVER STATE

(71) Applicant: HYUNDAI MOBIS Co., Ltd., Seoul (KR)

(72) Inventor: Myeong Nam Woo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 530 days.

(21) Appl. No.: 16/951,517

(22) Filed: Nov. 18, 2020

(65) Prior Publication Data

US 2021/0150237 A1 May 20, 2021

(30) Foreign Application Priority Data

Nov. 19, 2019 (KR) .................. 10-2019-0148476
Nov. 26, 2019 (KR) .................. 10-2019-0153073
Nov. 26, 2019 (KR) .................. 10-2019-0153074

(51) Int. Cl.
| | |
|---|---|
| *G06V 20/59* | (2022.01) |
| *B60R 1/00* | (2022.01) |
| *B60R 11/04* | (2006.01) |
| *G06V 40/16* | (2022.01) |
| *B60R 11/00* | (2006.01) |

(52) U.S. Cl.
CPC .............. *G06V 20/597* (2022.01); *B60R 1/00* (2013.01); *B60R 11/04* (2013.01); *G06V 40/166* (2022.01); *B60R 2011/0022* (2013.01); *B60R 2011/0085* (2013.01); *B60R 2011/0092* (2013.01); *B60R 2300/8006* (2013.01)

(58) Field of Classification Search
None
See application file for complete search history.

(56) References Cited

U.S. PATENT DOCUMENTS

| | | | | |
|---|---|---|---|---|
| 6,049,747 | A * | 4/2000 | Nakajima | ......... B60R 21/01538 |
| | | | | 340/576 |
| 11,615,632 | B2 * | 3/2023 | Yoshimura | ............. B60K 28/06 |
| | | | | 382/103 |
| 2019/0184909 | A1 * | 6/2019 | Shiota | .................... G08B 21/06 |

(Continued)

FOREIGN PATENT DOCUMENTS

| | | | | |
|---|---|---|---|---|
| CN | 110228420 | A * | 9/2019 | ............. B60R 11/04 |
| CN | 218032260 | U * | 12/2022 | |
| DE | 102018006578 | A1 * | 1/2019 | |

(Continued)

*Primary Examiner* — Rodney E Fuller
(74) *Attorney, Agent, or Firm* — Morgan, Lewis & Bockius LLP

(57) ABSTRACT

A driver status warning system includes a memory storing camera position data; an integrated controller configured to generate a motor driving signal corresponding to the camera position data; a camera assembly embedded in an A-pillar of a vehicle and including an electric motor configured to generate a rotational force according to the motor driving signal, a screw bar configured to be rotated by the rotational force, and a camera configured to be moved upward or downward on the A-pillar by the rotation of the screw bar assembly; and a facial recognition module configured to analyze an image of a driver's face captured by the camera to sense the driver's condition.

16 Claims, 9 Drawing Sheets

(56) References Cited

U.S. PATENT DOCUMENTS

2021/0009141 A1* 1/2021 Lu .................... G06V 40/162
2023/0131471 A1* 4/2023 Sobecki ................ G06V 40/19
                                                       348/148

FOREIGN PATENT DOCUMENTS

| KR | 10-0123201 B1 | 11/1997 |
| KR | 10-1999-0020497 A | 3/1999 |
| KR | 10-1159847 B1 | 6/2012 |
| KR | 10-1601294 B1 | 3/2016 |

\* cited by examiner

1

DRIVER STATE WARNING SYSTEM AND METHOD OF MONITORING DRIVER STATE

CROSS-REFERENCE TO RELATED APPLICATIONS

This application claims priority to and the benefit of Korean Patent Application No. 10-2019-0148476, filed on Nov. 19, 2019, Korean Patent Application No. 10-2019-0153073, filed on Nov. 26, 2019, and Korean Patent Application No. 10-2019-0153074, filed on Nov. 26, 2019, the disclosure of which is incorporated herein by reference in their entirety.

BACKGROUND

1. Field of the Invention

The present disclosure relates to a system for monitoring a driver's face and warning the driver of a negligent driving state.

2. Discussion of Related Art

A Driver State Warning (DSW) system is a system for monitoring a driver's face in real time using a state-of-the-art technology to detect a negligent driving state (the driver's motion pattern, line of sight, blinking time, eyelid closing cycle, yawning, or the like) and directly warning the driver of this state.

FIG. 1 is a diagram illustrating a mounting position of a DSW camera of the related art in a vehicle.

Referring to FIG. 1, a DSW camera 10 of the related art is mounted on a windshield. The mounting position is determined in consideration of monitoring of a driver's face.

However, in the related art, because a camera is fixedly mounted on the windshield, the driver's face cannot be accurately monitored when the driver is wearing a hat or according to the driver's height when seated. Therefore, there is a problem that a result of performing monitoring by the DSW camera 10 is not reliable.

SUMMARY OF THE INVENTION

In order to address the above-described problem, the present disclosure is directed to providing a Driver State Warning (DSW) system including a camera assembly in which a position of a DSW camera is variable to perform an auto-focusing control function, and a method of monitoring a driver state.

The above-described aspects, other aspects, advantages and features of the present disclosure and methods of achieving them will be apparent from the following description of embodiments described below in detail in conjunction with the accompanying drawings.

According to one aspect of the present disclosure, a driver status warning system includes a memory storing camera position data; an integrated controller configured to generate a motor driving signal corresponding to the camera position data; a camera assembly embedded in an A-pillar of a vehicle and including an electric motor configured to generate a rotational force according to the motor driving signal, a screw bar configured to be rotated by the rotational force, and a camera configured to be moved upward or downward on the A-pillar by the rotation of the screw bar assembly; and a facial recognition module configured to analyze an image of a driver's face captured by the camera to sense the driver's condition.

According to another aspect of the present disclosure, a driver status warning system includes a memory storing camera position data; an integrated controller configured to generate a motor driving signal corresponding to the camera position data; a camera assembly embedded in an A-pillar of a vehicle and including an electric motor configured to generate a rotational force according to the motor driving signal, a belt configured to be rotated by the rotational force, and a camera configured to be moved upward or downward on the A-pillar by the rotation of the belt; and a facial recognition module configured to analyze an image of a driver's face captured by the camera to sense the driver's condition.

According to another aspect of the present disclosure, there is provided a method of monitoring a driver's state by a driver status warning system including a camera assembly, which is embedded in an A-pillar of a vehicle and includes an electric motor, a screw bar configured to be rotated by a rotational force of the electric motor, and a camera configured to be moved upward or downward on the A-pillar by the rotation of the screw bar, the method including determining, by an integrated controller, whether camera position data is stored in a memory according to a start-on signal; when the camera position data is stored in the memory, controlling, by the integrated controller, the electric motor to move the camera to a position on the A-pillar corresponding to the camera position data; and analyzing, by a facial recognition module, an image of a driver's face captured at the position to which the camera is moved so as to monitor the driver's condition.

According to another aspect of the present disclosure, there is provided a method of monitoring a driver's state by a driver status warning system including a camera assembly, which is embedded in an A-pillar of a vehicle and includes an electric motor configured to generate a rotational force according to a motor driving signal, a belt rotated by the rotational force, and a camera moved upward or downward on the A-pillar by the rotation of the belt, the method including controlling, by an integrated controller, the electric motor according to camera position data stored in a memory to move the camera to a position on the A-pillar corresponding to the camera position data; and analyzing, by a facial recognition module, an image of a driver's face captured at the position to which the camera is moved so as to monitor the driver's condition.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
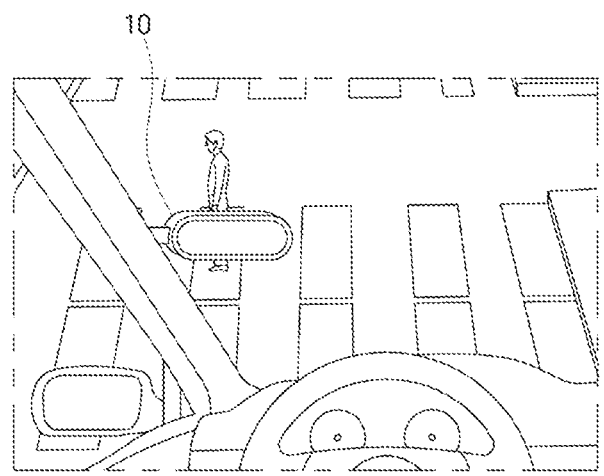
FIG. 1 is a diagram illustrating a mounting position of a Driver State Warning System (DSW) camera of the related art in a vehicle.

Hereinafter, embodiments of the present disclosure will be described in detail with reference to the accompanying drawings. Embodiments of the present disclosure are provided below to more fully describe the present disclosure to those of ordinary skill in the art and may be embodied in many different forms but the scope of the present disclosure is not limited thereto. Rather, these embodiments are provided so that the present disclosure will be thorough and complete and will fully convey the concept of the present disclosure to those of ordinary skill in the art. In the drawings, each component is exaggerated for convenience and clarity of description and the same reference numerals refer to the same elements. As used herein, the term "and/or" includes any and all combinations of one or more of the listed items.

The terms used herein are for the purpose of describing embodiments only and are not intended to be limiting of the present disclosure.

As used herein, singular forms may include plural forms unless the context clearly indicates otherwise. As used herein, the terms "comprises" and/or "comprising" specify the presence of stated shapes, integers, steps, operations, members, elements and/or groups thereof, but do not preclude the presence or addition of one or more other shapes, integers, steps, operations, members, elements and/or groups thereof.

Figure 2:
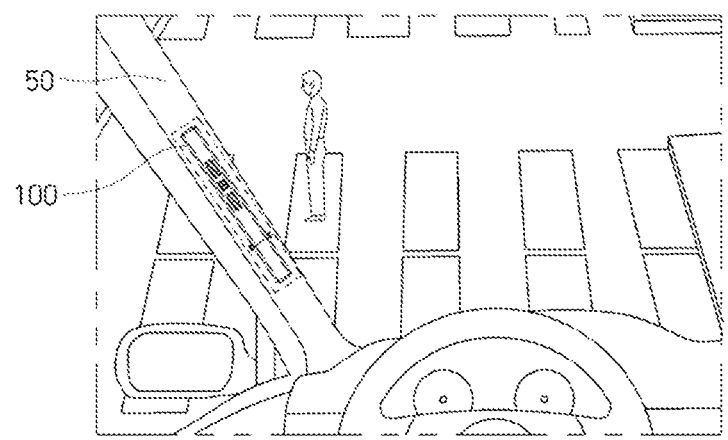
FIG. 2 is a diagram illustrating a mounting position of a DSW camera according to a first embodiment of the present disclosure.
Figure 3:
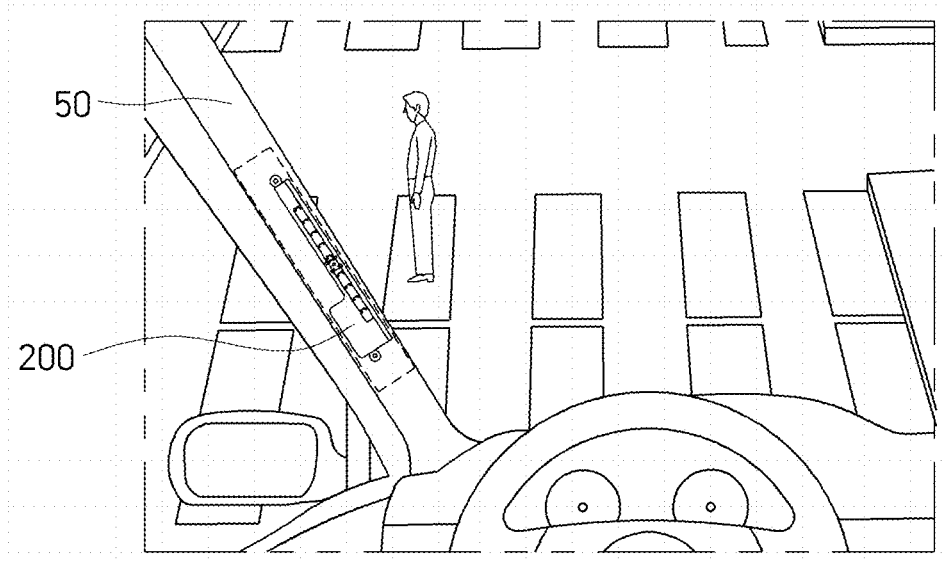
FIG. 3 is a diagram illustrating a mounting position of a DSW camera according to a second embodiment of the present disclosure.

FIG. 2 is a diagram illustrating a mounting position of a Driver State Warning System (DSW) camera, according to an embodiment of the present disclosure. FIG. 3 is a diagram illustrating a mounting position of a DSW camera, according to another embodiment of the present disclosure.

In the present disclosure, camera assemblies 100 and 200 described in two embodiments are provided.

As illustrated in FIGS. 2 and 3, the camera assemblies 100 and 200 according to two embodiments of the present disclosure are embedded in an A-pillar 50 inside a vehicle such that a camera is movable in an upward/downward direction along the A-pillar 50. Therefore, it is possible to secure a space in which an auto focusing module may be installed.

In addition, because the camera structure 10 of the related art illustrated in FIG. 1 is fixedly mounted on the windshield, a driver's field of view may be blocked, thus causing a blind spot, and therefore, there is a risk of an accident. In contrast, as illustrated in FIGS. 2 and 3, in the camera assemblies 100 and 200 according to the two embodiments of the present disclosure, the camera moves upward/downward along the A-pillar 50, thereby reducing the possibility of blocking of a driver's field of view or reducing the risk of an accident.

The camera assemblies 100 and 200 described in the two embodiments will be described in detail below.

First Embodiment

Figure 4:
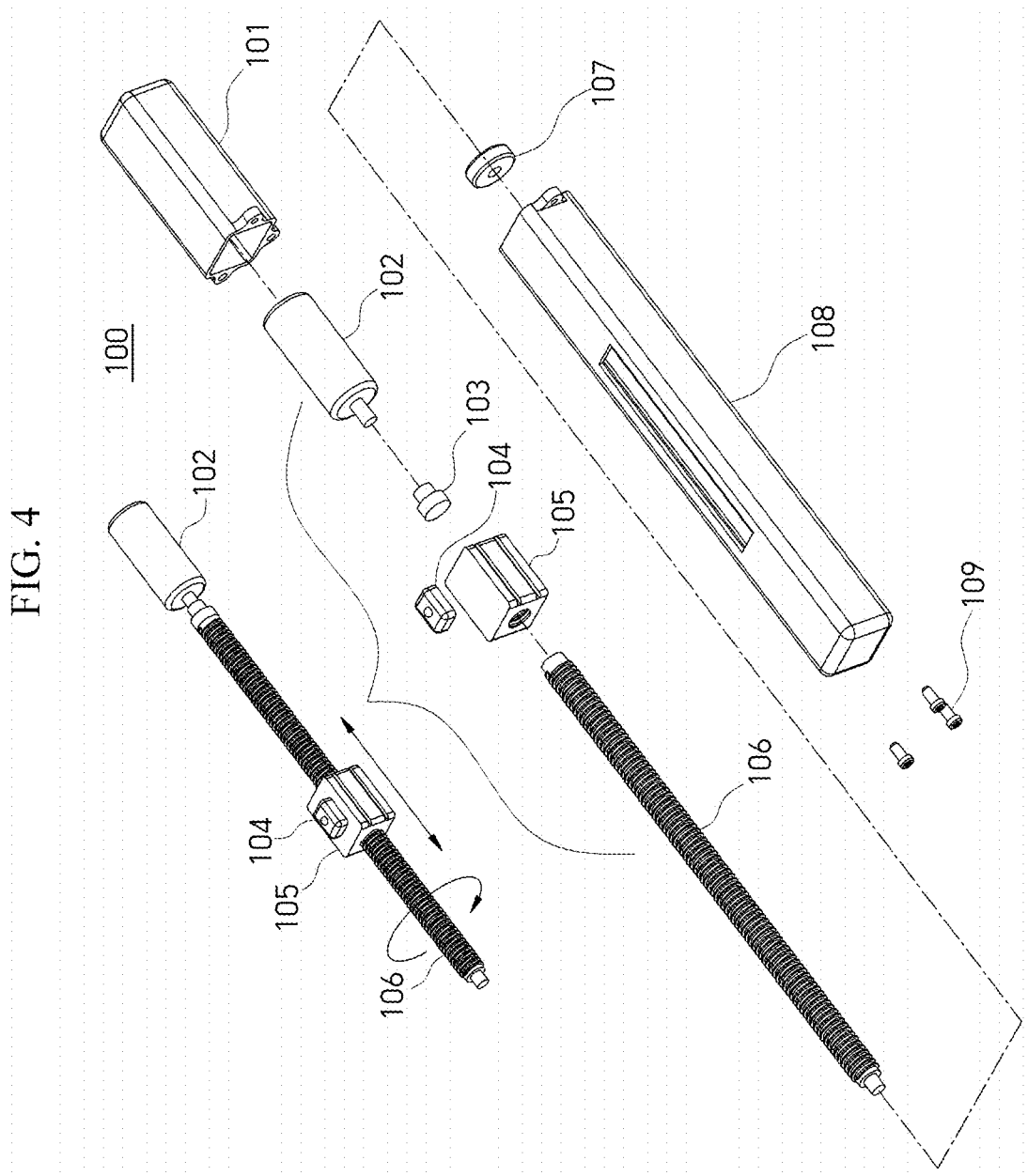
FIG. 4 is an exploded perspective view of a camera assembly according to the first embodiment of the present disclosure.

FIG. 4 is an exploded perspective view of a camera assembly 100 according to a first embodiment of the present disclosure.

Referring to FIG. 4, the camera assembly 100 according to the first embodiment of the present disclosure provides a structure in which a camera is movable in an upward/downward direction (or upward or downward) on an A-pillar 50 according to a screw method.

Specifically, the camera assembly 100 according to the first embodiment of the present disclosure includes a first cover 101, an electric motor 102, a coupler 103, a camera 104, a camera seating member 105, a screw bar 106, a bearing 107, a second cover 108, and a bolt 109.

The first cover 101 and the second cover 108 are assembled together to form a whole housing of the camera assembly 100 according to the first embodiment of the present disclosure.

The first cover 101 accommodates the electric motor 102 to protect the electric motor 102 from the outside.

The electric motor 102 outputs a rotational force through a motor rotation shaft. The motor rotation shaft of the electric motor 102 is mechanically connected to one end of the screw bar 106 through the coupler 103. Accordingly, a rotational force generated by the electric motor 102 is transmitted to the screw bar 106 through the coupler 103. The screw bar 106 is rotated by the rotational force transmitted through the coupler 103.

The coupler 103 connects the motor rotation shaft of the electric motor 102 and one end of the screw bar 106. Both sides of the coupler 103 are provided with a first insertion hole into which the motor rotation shaft of the electric motor 102 is inserted and a second insertion hole into which one end of the screw bar 106 is inserted. An outer circumferential surface of the motor rotating shaft and an inner circumferential surface of the first insertion hole are closely coupled to each other so that the coupler 103 may be rotated according to the rotation of the motor rotation shaft. An outer circumferential surface of one end of the screw bar 106 and an inner circumferential surface of the second insertion hole are also closely coupled to each other so that the screw bar 106 is rotated according to the rotation of the coupler 103.

As such, the coupler 103 mechanically connects the electric motor 102 and the screw bar 106, and compensates for a misalignment, caused when a central axis of the electric motor 102 and a central axis of the screw bar 106 are warped due to processing and assembly tolerances.

The camera 104 is a component configured to photograph a driver's face while moving on the screw bar 106 in a longitudinal direction of the screw bar 106.

The camera seating member 105 is a component on which the camera 104 is seated. The camera seating member 105 moves along a surface of the screw bar 106. The camera seating member 105 will be described in detail with reference to FIG. 5 below.

Figure 5:
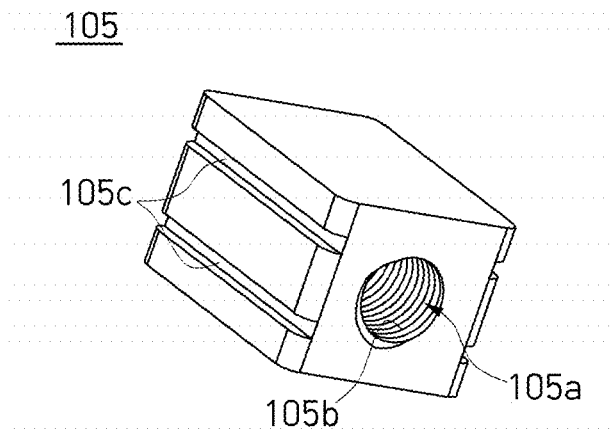
FIG. 5 is an enlarged perspective view of a camera seating member illustrated in FIG. 4.
Figure 6:
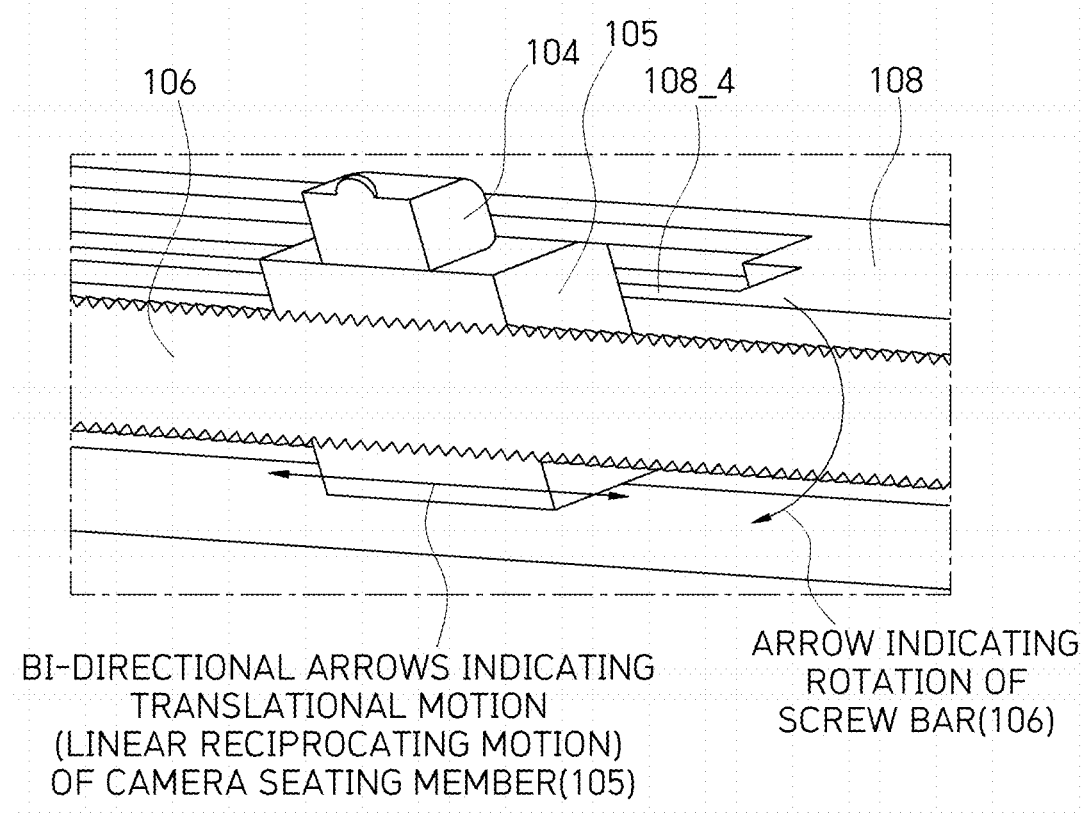
FIG. 6 is a view for describing a fastening structure of the camera seating member illustrated in FIG. 5 and a screw bar illustrated in FIG. 4.

FIG. 5 is an enlarged perspective view of the camera seating member 105 of FIG. 4. FIG. 6 is a diagram illustrating a fastening structure of the camera seating member 105 of FIG. 5 and the screw bar 106 of FIG. 4.

Referring to FIG. 5, the camera seating member 105 has a hexahedral shape as a whole and includes a through-hole 105*a* through which the screw bar 106 passes.

An inner circumferential surface of the through-hole 105*a* is provided with a female thread 105*b* to be fastened with a male thread formed on a surface of the screw bar 106. Accordingly, the camera seating member 105 and the screw bar 106 are coupled through a screw fastening structure as illustrated in FIG. 6.

Due to the screw fastening structure, when the screw bar 106 is rotated clockwise or counterclockwise by a rotational force of the electric motor 102 while the screw bar 106 is fixed, the camera seating member 105 translationally moves (linear reciprocating motion or linear motion) along a surface of the screw bar 106.

Both outer surfaces of the camera seating member 105 (both outer surfaces adjacent to one side of the camera seating member 105 on which the camera is seated) are provided with two rotation preventing grooves 105*c* into which two rotation preventing protrusions 108_4 formed on both inner surfaces of the second cover 108 are inserted to prevent rotation of the camera seating member 105 when the screw bar 106 rotates.

Referring back to FIG. 4, the screw bar 106 transmits a rotational force from the electric motor 102 to the camera seating member 105 through the coupler 103 as described above. The other end of the screw bar 106 is engaged with the bearing 107.

The bearing 107 supports the other end of the screw bar 106 to allow only rotary motion while the screw bar 106 is fixed.

The second cover 108 is assembled with the first cover 101 while accommodating the screw bar 106 and the camera seating member 105. The second cover 108 will be described in detail with reference to FIGS. 7 and 8 below.

Figure 7:
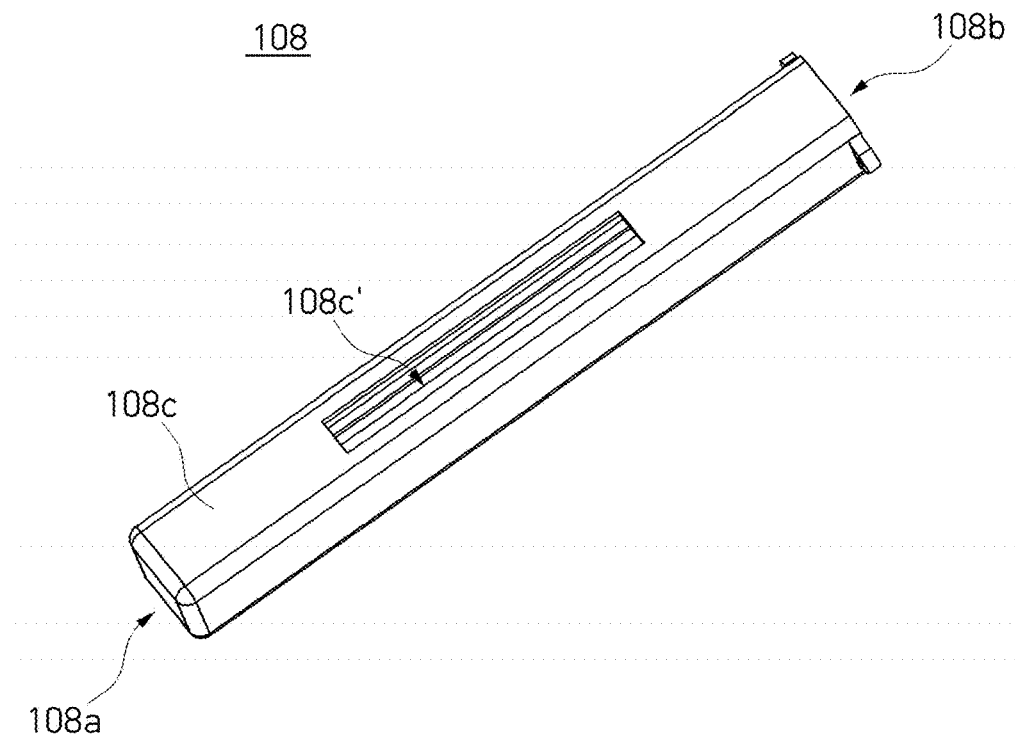
FIGS. 7 and 8 are enlarged perspective views of a second cover illustrated in FIG. 4 when viewed from different viewpoints.
Figure 8:
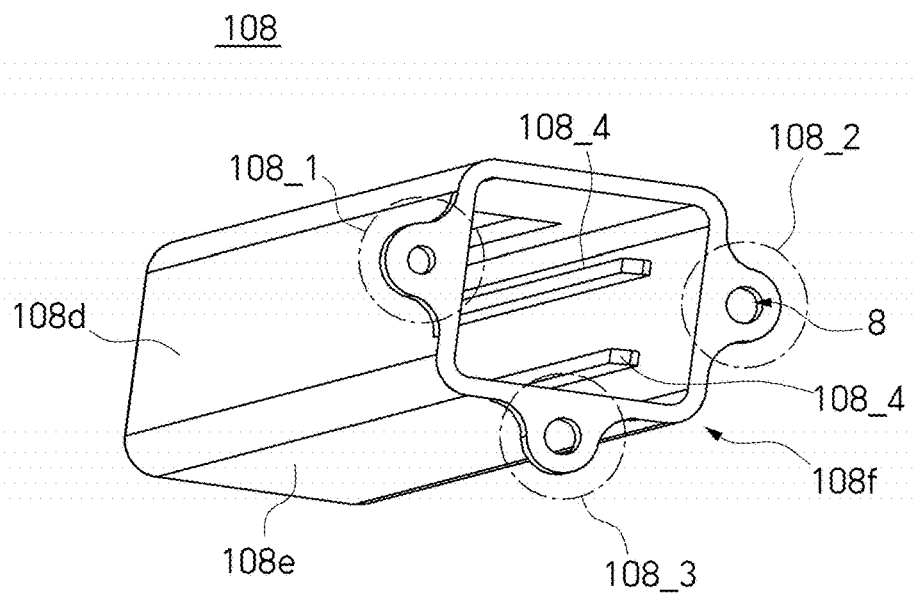

FIGS. 7 and 8 are enlarged perspective views of a second cover illustrated in FIG. 4 when viewed from different viewpoints.

Referring to FIGS. 7 and 8, the second cover 108 has a long empty body having a parallelepiped shape to accommodate the screw bar 106, which is elongated, and the camera seating member 105.

A front surface 108*a* which forms the body of the second cover 108 has a closed structure, and a rear surface 108*b* has an open structure. The screw bar 106 and the camera seating member 105 on which the camera 104 is seated (or attached) are accommodated in the second cover 108 through an open rear surface 108*b*.

A side surface 108*c* among four side surfaces 108*c*, 108*d*, 108*e*, and 108*f* of the body is provided with a long tetragonal (or rectangular) hole 108*c*' which exposes the camera seating member 105 accommodated in the body to the outside.

A lens of the camera 104 seated on an exposed side of the camera seating member 105 linearly moves according to the linear motion of the camera seating member 105 so that a driver's face may be photographed at an appropriate position matching to the driver's sitting height.

As illustrated in FIG. 8, three wing portions 108_1, 108_2, and 108_3 are molded around the open rear surface 108*b* and are each provided with a fastening hole 8 through which the bolt 109 of FIG. 4 passes.

Although not described in detail in the above description of the first cover 101, a rear surface of the first cover 101 is open to accommodate the electric motor 102, and three wings are also provided around the rear surface of the first cover 101 and at positions corresponding to the three wing portions 108_1, 108_2, and 108_3 of the second cover 108. A fastening hole corresponding to the fastening hole 8 is formed in each of the wing portion of the first cover 101. The bolt 109 passing through the fastening hole 8 passes through the fastening hole of each of the wing portions of the first cover 101 so that the wing portions 108_1, 108_2 and 108_3 around the rear surface of the second cover 108 and the wing portions around the rear surface of the first cover 101 may be fastened through the bolt 109. Therefore, the first cover 101 and the second cover 108 are assembled together.

As briefly described in the above description of FIG. 6, the two rotation preventing protrusions 108_4 are formed on both inner surfaces of the second cover 108 as illustrated in FIG. 8. As described above, the rotation preventing protrusions 108_4 are inserted into the two rotation preventing grooves 105*c* in both outer surfaces of the camera seating member 105 illustrated in FIG. 5 to support the camera seating member 105 so that the camera seating member 105 may not be rotated according to the rotation of the screw bar 106.

As such, the rotation preventing protrusions 108_4 support the camera seating member 105 so as not to rotate, thereby allowing translational motion (linear reciprocating motion) of the camera seating member 105.

At the same time, the rotation preventing protrusions 108_4 are formed on both inner surfaces of the second cover 108 to extend long in the longitudinal direction of the screw bar 106 so as to guide the linear reciprocating motion of the camera seating member 105.

Second Embodiment

Figure 9:
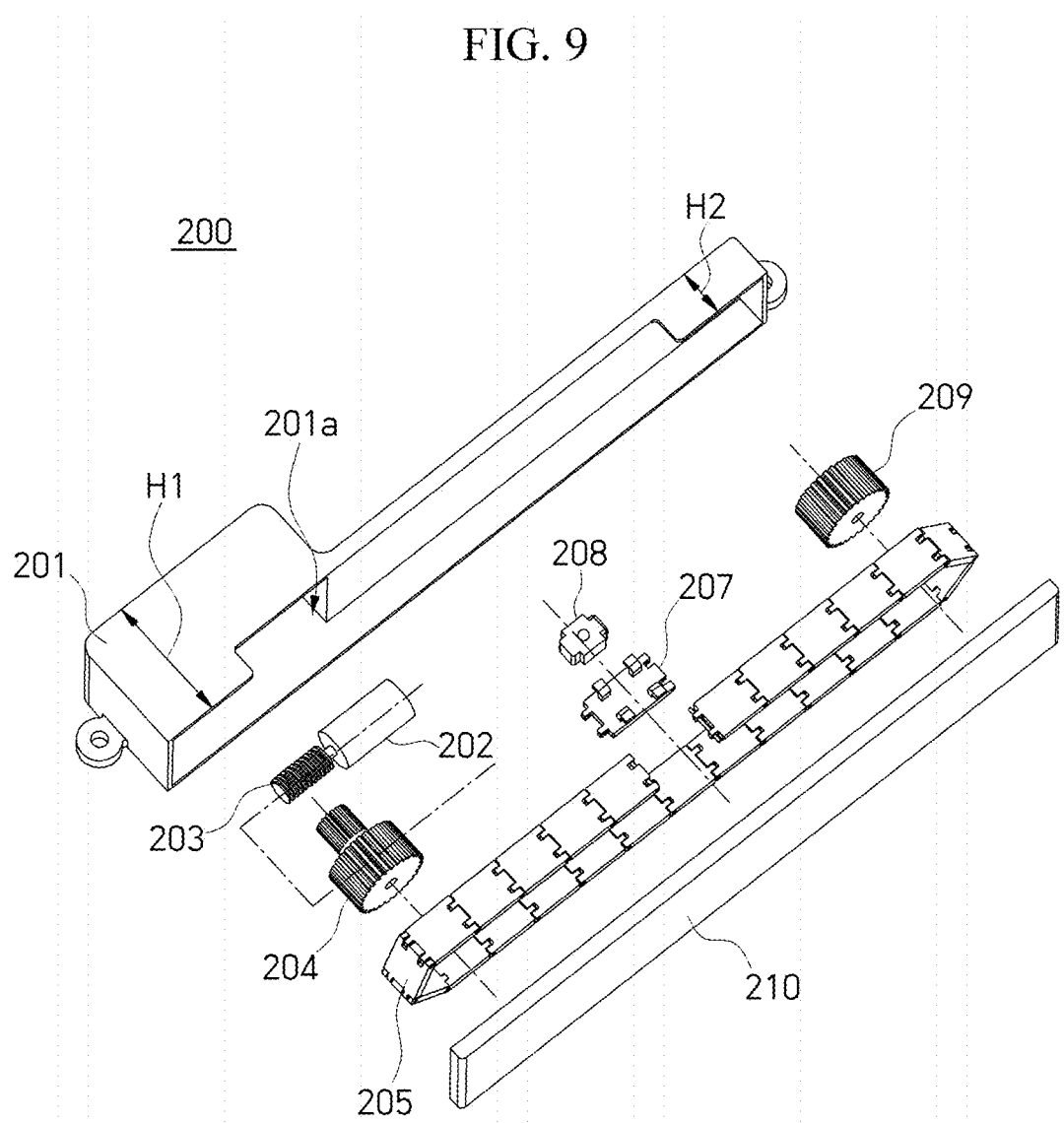
FIG. 9 is an exploded perspective view of a camera assembly according to the second embodiment of the present disclosure.

FIG. 9 is an exploded perspective view of a camera assembly 200 according to a second embodiment of the present disclosure.

Referring to FIG. 9, the camera assembly 200 according to the second embodiment of the present disclosure provides a structure in which a camera is movable in an upward/downward direction (or upward or downward) on an A-pillar 50 according to a belt method.

Specifically, the camera assembly 200 according to the second embodiment of the present disclosure includes an upper cover 201, an electric motor 202, a motor reducer 203, a helical gear 204, a belt 205, a camera seating plate 207, a camera 208, a fixed gear 209, and a lower cover 210.

The upper cover 201 covers the lower cover 210 and provides an accommodation space to accommodate the components 202, 203, 204, 205, 207, 208 and 209.

The upper cover 201 has an external shape with a step having a first height H1 and a second height H2 lower than the first height H1. Accordingly, the accommodation space may be divided into a first accommodation space corresponding to the first height H1 and a second accommodation space corresponding to the second height H2.

The first accommodation space is a space occupied by the electric motor 202 and components directly connected to the electric motor 202. That is, the first accommodation space is a space in which the electric motor 202, the motor reducer 203, and the helical gear 204 are accommodated.

As described above, only a space for accommodation of the electric motor 202 is formed to be wide and the remaining space is formed to be small, so that a space in which the camera assembly 200 is embedded in the A-pillar 60 may be efficiently designed.

One side surface of the upper cover 201 has a structure that is cut long in a rectangular shape. Due to the cut structure, a rectangular opening 201a is formed by the assembly of the upper cover 201 and the lower cover 210.

The camera seating plate 207 is exposed by the opening 201a and the camera 208 is seated on the exposed camera seating plate 207, and thus, when the camera 208 linearly moves according to the linear motion of the camera seating plate 207, a driver's face is photographable at an appropriate position (position of the driver's face) matching the driver's height when seated.

The electric motor 202 provides a rotational force for rotating the belt 205.

The motor reducer 203 is connected to a motor rotation shaft of the electric motor 202.

The motor reducer 203 is rotated by the rotation of the motor rotation shaft, and a screw thread is formed on an outer circumferential surface thereof to be gear-coupled to a screw thread formed on an outer circumferential surface of the helical gear 204. Thus, the motor reducer 203 transmits the rotational force of the electric motor 202 to the helical gear 204.

A central shaft of the helical gear 204 is disposed perpendicular to that of the motor reducer 203. The helical gear 204 is gear-coupled to the motor reducer 203 at an appropriate reduction ratio so as to obtain a rotational force for rotating the belt 205.

The helical gear 204 may be referred to as a 'moving spur gear'. The helical gear 204 may be fixed to the upper cover 201 or the lower cover 210 by a fixed shaft (not shown).

The belt 205 is rotated by the rotational force transmitted from the helical gear 204. A friction material or gear may be formed on a bottom of the belt 205 to minimize loss of the rotational force transmitted from the helical gear 204. The belt 205 may be replaced with chains, and each of the chains may be fixed with a pin.

The camera seating plate 207 is connected to both ends of the belt 205 and thus moves in a linear reciprocating manner (or linear manner) when the belt 205 is rotated, and at the same time, the camera 208 is seated on (or attached to) an upper surface of the camera seating plate 207.

The camera seating plate 207 will be described in more detail with reference to FIG. 10 below.

Figure 10:
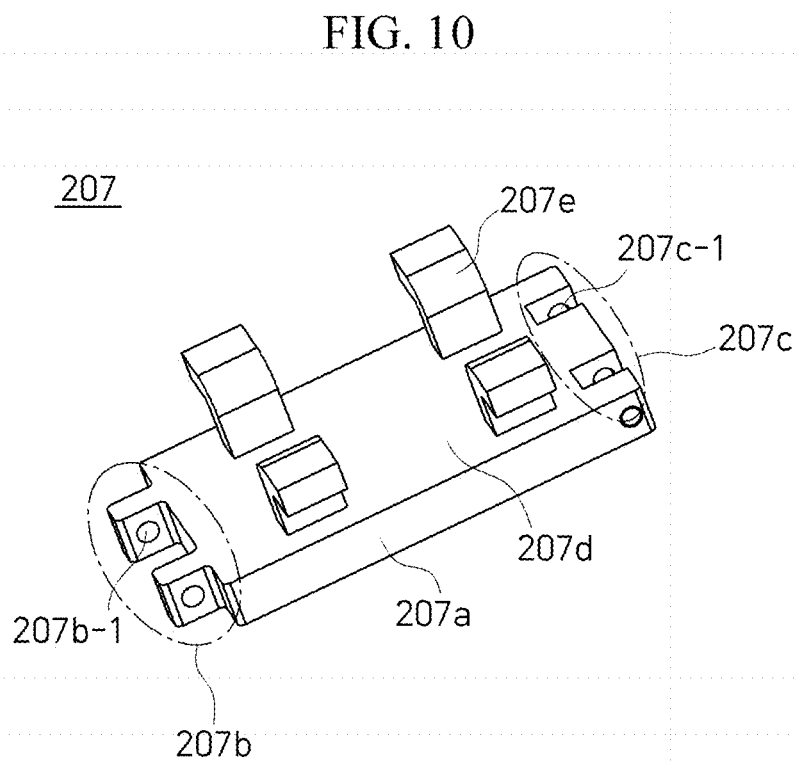
FIG. 10 is an enlarged perspective view of a camera seating plate illustrated in FIG. 9.
Figure 11:
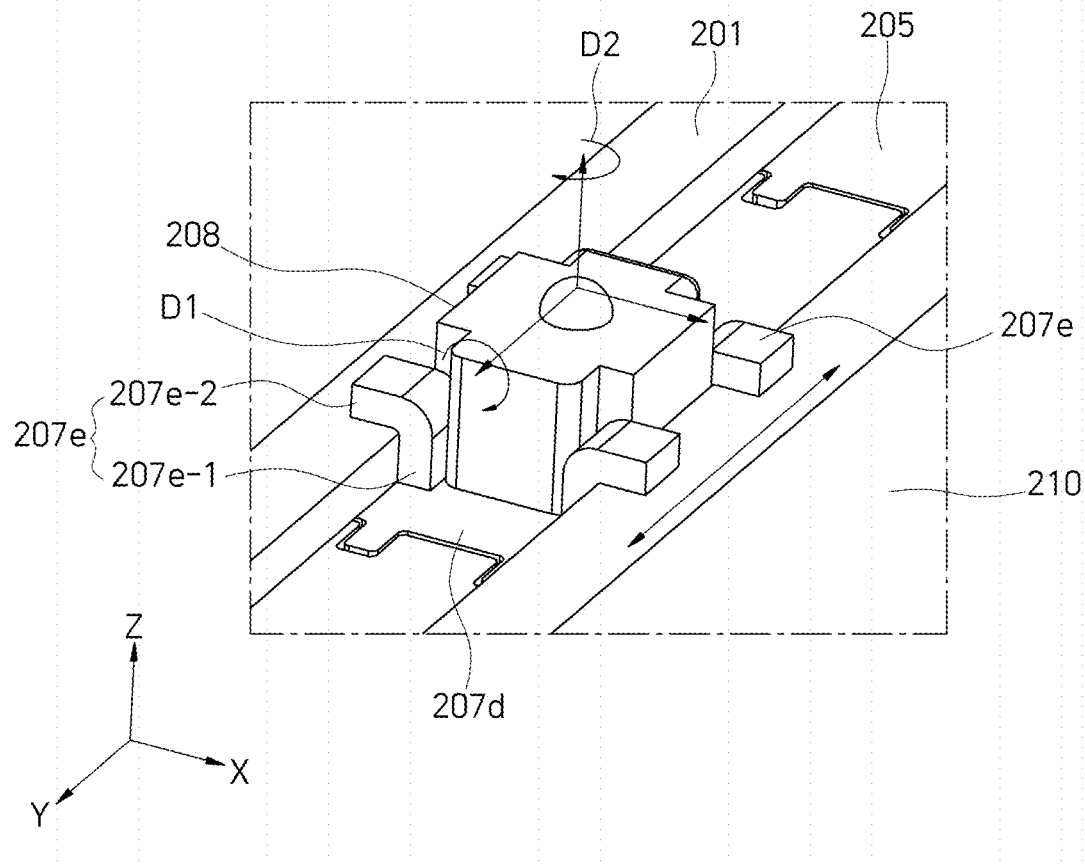
FIG. 11 is a view illustrating a state in which a camera is seated on the camera seating plate of FIG. 10.

FIG. 10 is an enlarged perspective view of the camera seating plate 207 of FIG. 9. FIG. 11 is a view showing a state in which the camera 208 is seated on the camera seating plate 207 of FIG. 10.

Referring to FIG. 10, the camera seating plate 207 has a body 207a having a tetragonal plate shape.

Both ends of the body 207a are provided with coupling portions 207b and 207c connected to both ends of the belt 205.

A coupling hole 207b-1 is formed in the coupling portion 207b formed at one end of the body 207a and is coupled with a protrusion formed on one end of the belt 205. A coupling protrusion 207c-1 is formed in the coupling portion 207c formed at the other end of the body 207a and is coupled with a coupling groove formed in the other end of the belt 205. Due to the above coupling structure, the camera seating plate 207 functions as a component of the belt 205.

An upper surface 207d of the body 207a is provided with four linear guides 207e (having, for example, a ']' shape) which extend in a vertical direction and are then bent at 90°. In FIG. 11, reference numeral 207e-1 represents a portion of the linear guide 207e extending in the vertical direction, and reference numeral 207e-2 represents a portion of the linear guide 270e which is bent at 90°.

The four linear guides 207e are formed in the ']' shape as described above, and as illustrated in FIG. 11, two of the linear guides 207e are seated such that bottom surfaces thereof cover corner portions formed by the cut structure 201a of FIG. 9 of the upper cover 201 and the other two linear guides 207e are seated to cover corner portions of the lower cover 210.

As the linear guides 207e are seated as described above, the camera seating plate 207 does not rotate in a direction D1 of rotation about a Y-axis and a direction D2 of rotation about a Z-axis as illustrated in FIG. 11.

In addition, a portion 207e-1 of each of the linear guides 207e extending in the vertical direction serves as a support for fixing the camera 208 so as not to be moved or rotated on an upper surface 207d of the camera seating plate 207.

Accordingly, the camera 208 does not rotate in the direction D1 of rotation about the Y-axis and the direction D2 of rotation about the Z-axis, thereby preventing a focal point of the camera 208 from being changed or the camera 208 from being out of focus during movement of the camera 208.

Referring back to FIG. 9, the fixed gear 209 is disposed a certain distance from the helical gear 204 to provide an appropriate tension to the belt 205 to support the belt 205 to be rotatable together with the helical gear 204. The fixed gear 209 may be fixed to the upper cover 201 or the lower cover 210 by a fixing pin (not shown).

Figure 12:
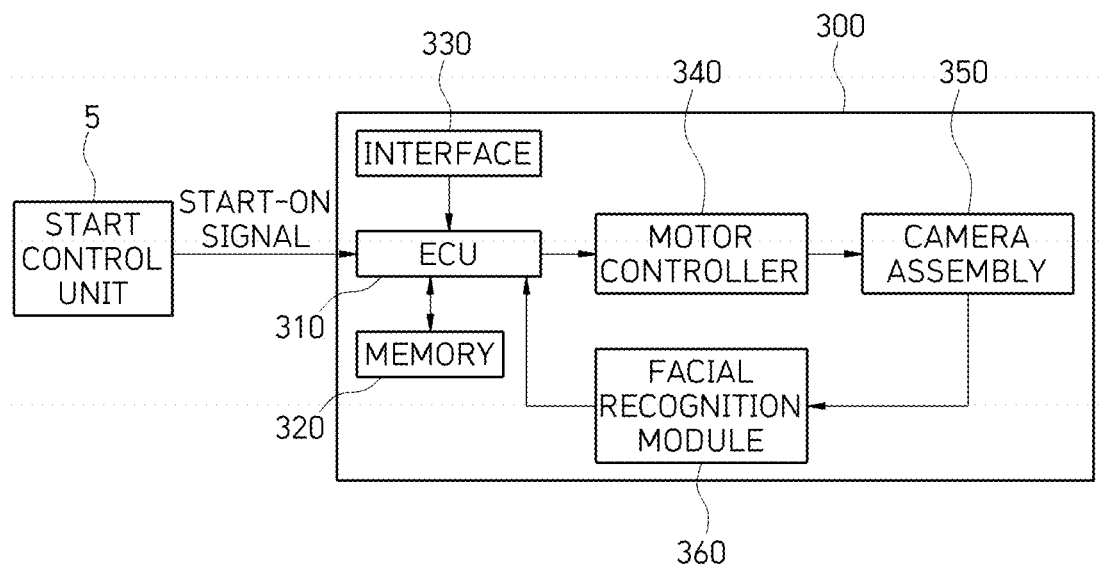
FIG. 12 is a block diagram of a driver state warning system according to an embodiment of the present disclosure.

FIG. 12 is a block diagram of a driver state warning system 300 according to an embodiment of the present disclosure.

Referring to FIG. 12, the driver state warning system 300 according to the embodiment of the present disclosure includes an electronic control unit (ECU) 310, a memory 320, an interface 330, a motor controller 340, a camera assembly 350 (or 100 or 200), and a facial recognition module 360.

The ECU 310 is a component that manages and controls overall operations of the components 320 to 360 included in the system 300, and may include one or more general-purpose microprocessors, digital signal processors (DSPs), hardware cores, application specific integrated circuits (ASICs), field programmable gate arrays (FPGAs), or a combination thereof.

The ECU 310 communicates with a start control unit 5 using vehicle network communication. Here, the vehicle network communication may be, for example, controller-area network (CAN) communication or local interconnect network (LIN) communication.

The ECU 310 receives a start-on signal or a start-off signal from the start control unit 5 through vehicle network communication. The ECU 310 searches for camera position data recorded in (or registered with) the memory 320 in response to the received start-on signal, and generates a motor control signal corresponding to the searched-for camera position data and inputs the motor control signal to the motor controller 340 when the camera position data is searched for.

The camera position data recorded in the memory 320 may be camera position data of the camera 104 included in the camera assembly 100 according to the first embodiment of FIG. 4 or camera position data of the camera 208 included in the camera assembly 200 according to the second embodiment of FIG. 9.

The camera position data recorded in the memory 320 is position data determined according to the driver's height when seated on a driver's seat, and indicates a specific point of an A-pillar in a vehicle at which the camera 104 of FIG. 4 or 208 of FIG. 9 is located.

That is, position data of the camera 104 or 208 may be data indicating a point on the A-pillar in the vehicle at which the driver's face may be photographed according to the driver's height when seated and under best conditions.

In contrast, in the first embodiment of FIG. 4, position data of the camera 104 of FIG. 4 may be data corresponding to a specific point on a surface of the screw bar 106 illustrated in FIG. 4.

In the second embodiment of FIG. 9, position data of the camera 208 of FIG. 9 may be data corresponding to a specific point to which the camera 208 is moved by the rotation of the belt 205 of FIG. 9.

However, in both the first embodiment and the second embodiment, the camera position data recorded in the memory 320 is data set so that the driver's face is photographable according to the driver's height when seated and under best conditions.

As described above, the memory 320 is a storage medium which camera position data is recorded in (stored in), and may include a random access memory (RAM) such as a synchronous dynamic random access memory (SDRAM), a read-only memory (ROM), a non-volatile random access memory (NVRAM), an electrically erasable programmable read-only memory (EEPROM), a flash memory, and the like.

There may be a case in which a vehicle is driven by other drivers who are not the actual owner of the vehicle. In this case, camera position data corresponding to the other drivers' heights when seated need to be recorded in the memory 320. Accordingly, a plurality of pieces of camera position data classified according to driver identification information may be recorded in the memory 320.

When a plurality of pieces of camera position data classified by driver are recorded in the memory 320, the ECU 310 should be capable of identifying a driver to search for camera position data corresponding to the driver.

To this end, the ECU 310 identifies a driver according to user input information input through the interface 330. When the driver is identified according to the user input information input from the interface 330, the ECU 310 searches for camera position data corresponding to the identified driver, generates a motor control signal corresponding to the searched-for camera position data, and inputs the motor control signal to the motor controller 340.

The motor controller 340 inputs a motor driving signal corresponding to the camera position data retrieved from the memory 320 to the electric motor 102 or 202 included in the camera assembly 350 (or 100 or 200), in response to the motor control signal input from the ECU 310.

The electric motor 102 or 202 included in the camera assembly 350 (or 100 or 200) generates a rotational force (rotation torque) in response to the motor driving signal from the motor controller 340.

The screw bar 106 of FIG. 4 included in the camera assembly 100 according to the first embodiment or the belt 205 of FIG. 9 included in the camera assembly 200 according to the second embodiment is rotated by the rotational force generated by the electric motor 102 or 202, and the camera 104 or 208 is linearly moved to a position corresponding to the camera position data recorded in the memory 320 by the rotation of the screw bar 106 of FIG. 4 or the belt 205 of FIG. 9.

The camera assembly 350 (100 or 200) includes the camera 104 or 208, and includes a plurality of components for the linear movement of the camera 104 or 208. Actual internal components of the camera assembly 350 (100 or 200) has been described in detail with respect to the first and second embodiments by referring to FIGS. 2 to 11 and thus a description thereof will be omitted here.

The facial recognition module 360 may be configured to analyze the image of the driver's face input from the camera 104 or 208 included in the camera assembly 350 (100 or 200), and control a warning part (a speaker, a light-emitting diode (LED), or the like) (not shown in FIG. 12) to generate a warning event (an alarm, a flashing signal, warning sound, a warning guide voice or the like) when a negligent driving state (the driver's motion pattern, line of sight, blinking time, eyelid closing cycle, yawning or the like) is sensed.

A facial recognition algorithm may be used to analyze the image of the driver's face, and the facial recognition module 360 may include one or more general-purpose microprocessors, a graphic processor (GPU), digital signal processors (DSPs), hardware cores, application-specific integrated circuits (ASICs), field-programmable gate arrays (FPGAs), or a combination thereof to execute the facial recognition algorithm. A description of the facial recognition algorithm will be replaced by the related art, because facial recognition algorithms are widely known and the present disclosure is not characterized by a facial recognition algorithm.

In order to set camera position data to be recorded in the memory 320, the facial recognition module 360 may output pass data indicating the success of facial recognition for an image of the driver's face captured at a current position of the camera 104 or 208 (e.g., a position of the camera 104 or 108 on the A-pillar, a surface of the screw bar 106 or the like) and fail data indicating the failure of the facial recognition to the ECU 310.

A process of setting camera position data will be described below.

First, it is assumed that the camera 104 or 208 included in the camera assembly 350 (100 or 200) is located at any point on the surface of the screw bar 106 according to the first embodiment or any point on a horizontal side (long side) of the rectangular opening 201a formed by the assembly of the cover 210 and the lower cover 210 according to the second embodiment, and the position thereof will be referred to as an initial position.

The ECU 310 inputs a first initial motor control signal for setting camera position data in the motor controller 340, and the motor controller 340 transmits an initial motor driving signal to the electric motor 102 or 202 included in the camera assembly 350 (100 or 200) in response to the first initial motor control signal.

In this case, the electric motor 102 or 202 generates an initial rotational force (initial rotation torque) corresponding to the first initial motor driving signal to linearly move the camera 104 or 208 by the amount of movement set according to the initial rotational force (initial rotation torque).

When the camera 104 or 208 is moved linearly by the amount of movement, the facial recognition module 360 generates a facial image by photographing the face of the driver sitting on a driver's seat at a position to which the camera 104 or 208 is linearly moved and analyzes the facial image to determine whether facial recognition is successful or not.

When the facial recognition fails, the facial recognition module 360 transmits fail data to the ECU 310, and when receiving the fail data, the ECU 310 determines that the initial position of the camera 104 or 208 is not a position at which the driver's face sitting on the driver's seat can be recognized and thus transmits a second initial motor control signal to the motor controller 340 to move the camera 104 or 208 step by step, capture an image of the driver's face, and analyze the captured image, thereby finding optimum camera position data.

When the facial recognition is successful, the facial recognition module 360 transmits pass data to the ECU 310, and when receiving the pass data, the ECU 310 determines that the initial position of the camera 104 or 208 is a position at which the driver's face sitting on the driver's seat is recognizable and thus converts the amount of movement of the camera 104 or 208 according to the rotational force (rotation torque) of the electric motor 102 or 202 corresponding to the first initial motor control signal into position data and stores the position data as camera position data in the memory 320. The camera position data is set in this way.

Referring to FIG. 12, the ECU 310 and the motor controller 340 are separated from each other, but this is only an example and the motor controller 340 may be embedded in the ECU 310 or the ECU 310 may be embedded in the motor controller 340 according to design. That is, the ECU 310 and the motor controller 340 may be integrated into one module, and in this case, the module may be referred to as an 'integrated controller'.

Figure 13:
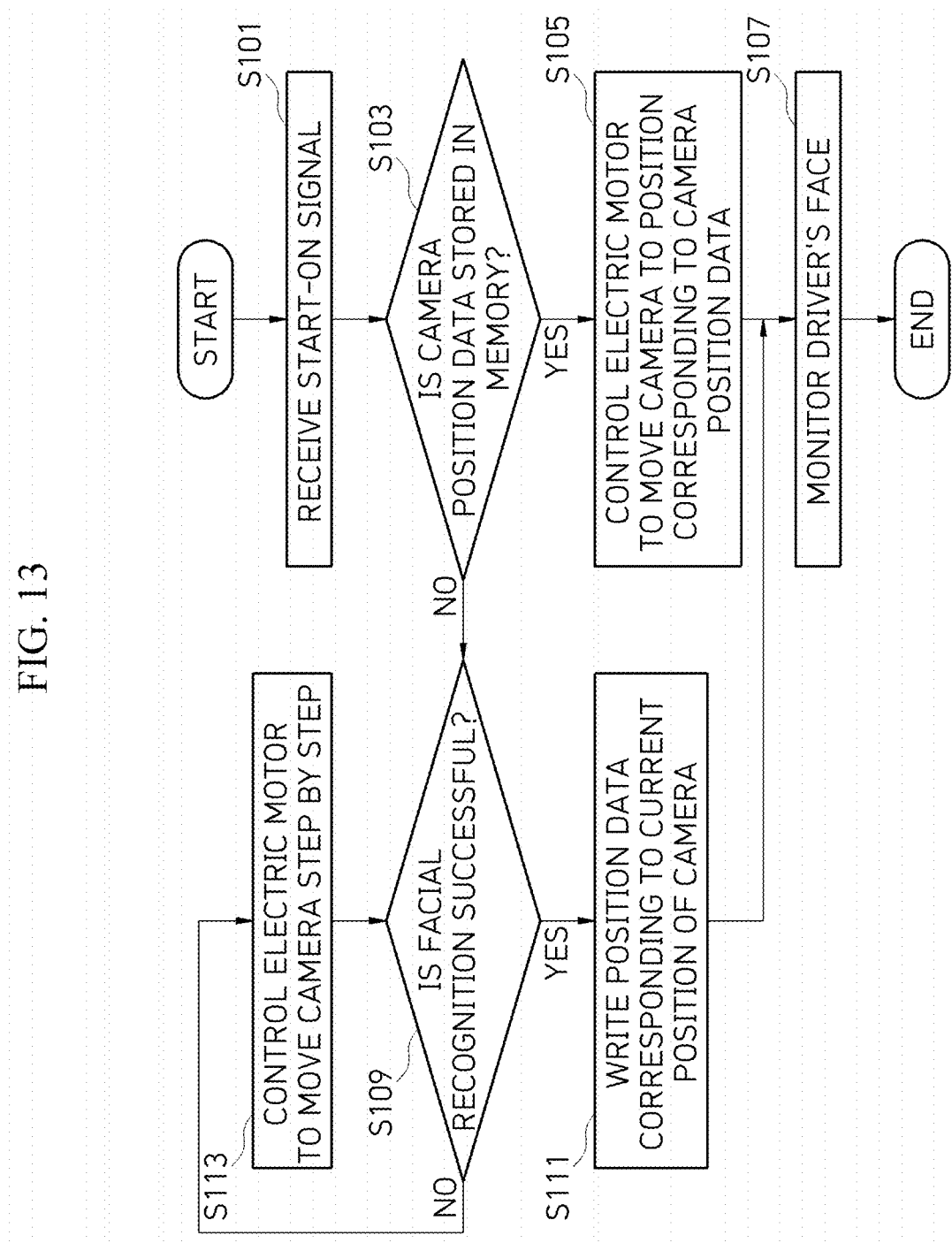
FIG. 13 is a flowchart of a method of monitoring a driver's state by the driver state warning system of FIG. 12.

FIG. 13 is a flowchart of a method of monitoring a driver's state by the driver state warning system of FIG. 12. For better understanding of the following description, FIG. 12 will be also referred to and parts of FIG. 12 that are the same as those of FIG. 13 will be briefly described or omitted here when operations of the flowchart of FIG. 13 are described below.

Referring to FIG. 13, first, in operation S101, the ECU 310 receives a start-on signal from the start control unit 5.

Next, in operation S103, the ECU 310 accesses the memory 320 to determine whether camera position data has been previously recorded (stored or written). The method proceeds to operation S105 when camera position data has been recorded in the memory 320 and proceeds to operation S109 when camera position data has not been recorded in the memory 320.

First, when camera position data has been recorded in the memory 320, in operation S105, the ECU 310 controls the electric motor 102 of FIG. 4 or 202 of FIG. 9 through the motor controller 340 to move the camera 104 of FIG. 4 or 208 of FIG. 9 to a position corresponding to the camera position data recorded in the memory 320. Here, the position to which the camera 104 or 208 is moved may be a position on the A-pillar of the vehicle, a position on the surface of the screw bar 106 of FIG. 4, or a position on a horizontal side (long side) of the opening 201a of FIG. 9.

Thereafter, in operation S107, when the camera 104 or 208 is moved to the position corresponding to the camera position data recorded in the memory 320, monitoring of a driver's face by the facial recognition module 360 starts.

Returning back to operation S103, when the ECU 310 determines that the camera position data is not recorded in the memory 320, a series of processes of registering (recording, writing or storing) the camera position data in the memory 320 are performed.

Specifically, when the camera position data is not recorded in the memory 320, in operation S109, the facial recognition module 360 analyzes a facial image captured by the camera 104 or 208 at a current location to determine whether facial recognition is successful. In more detail, when camera position data is not recorded in the memory 320, the camera 104 or 208 is moved to an initial position on the screw bar 106 of FIG. 4 which is identifiable by the ECU 310 or an initial position on a horizontal side (long side) of the opening 201a of FIG. 9 which is identifiable by the ECU 310. The movement of the camera to the initial position may be performed whenever the vehicle is turned off, as well as when camera position data is not recorded in the memory 320.

Next, in operation S109, after the ECU 310 controls the electric motor 102 or 202 through the motor controller 340 to move the camera 104 or 208 by a predetermined amount of movement, starting from the initial position, the facial recognition module 360 analyzes an image of the driver's face captured by the camera 104 or 208 at the position to which the camera 104 or 208 is moved (hereinafter referred to as a current position) to determine whether facial recognition is successful. Here, in order to move the camera 104 or 208 by the predetermined amount of movement, the ECU 310 generates a motor control signal, for position setting, corresponding to the predetermined amount of movement, and the motor controller 340 outputs the motor drive signal for position setting to the electric motor 102 or 202.

When the facial recognition performed by the facial recognition module 360 at the current position of the camera 104 or 208 is successful, result data (pass data) is transmitted to the ECU 310.

Thereafter, in operation S111, the ECU 310 writes (stores or records) position data corresponding to the current position of the camera 104 or 208 to the memory 320 in response to the result data (pass data).

When it is determined in operation S109 that the facial recognition fails, the facial recognition module 360 transmits result data (fail data) to the ECU 310. In operation S113, the ECU 310 controls a rotational force (rotation torque) of the electric motor 102 or 202 through the motor controller 340 according to the result data (fail data) so as to move the camera 104 or 208 step by step. The stepwise movement of the camera 104 or 208 is repeatedly performed until facial recognition is successfully performed by the facial recognition module 360.

According to the present disclosure, the performance of a DSW system can be improved by minimizing the influences of a driver's physical condition (e.g., the driver's height or height when seated) or clothing (e.g., a hat) covering the driver's face and actively changing a position of a DSW camera to remove limitations due to the driver's physical conditions or a use environment.

The present disclosure has been described above with respect to the embodiments thereof. It will be understood by those of ordinary skill in the art that various modifications or changes may be made in the present disclosure without departing from essential features of the present disclosure. Therefore, the embodiments set forth herein should be considered in a descriptive sense only and not for purposes of limitation. The scope of the present disclosure is set forth in the claims rather than in the foregoing description, and all differences falling within a scope equivalent thereto should be construed as being included in the present disclosure.

What is claimed is:

1. A driver status warning system comprising:
a memory storing camera position data;
an integrated controller configured to generate a motor driving signal corresponding to the camera position data;
a camera assembly embedded in an A-pillar of a vehicle, wherein the camera assembly comprises an electric motor configured to generate a rotational force according to the motor driving signal, a screw bar configured to be rotated by the rotational force, and a camera configured to be moved upward or downward on the A-pillar by the rotation of the screw bar assembly; and
a facial recognition module configured to analyze an image of a driver's face captured by the camera to sense the driver's condition.

2. The driver status warning system of claim 1, wherein the camera position data stored in the memory comprises data corresponding to the driver's height when seated.

3. The driver status warning system of claim 1, wherein the memory stores a plurality of pieces of camera position data classified by driver.

4. The driver status warning system of claim 1, wherein, when result data indicating success of facial recognition for an image of the driver's face captured by the camera at a current position of the camera on the A-pillar from the facial recognition module is received, the integrated controller writes the camera position data corresponding to the current position on the A-pillar to the memory.

5. The driver status warning system of claim 1, wherein, when result data indicating failure of facial recognition for an image of the driver's face captured at a current position of the camera on the A-pillar from the facial recognition module is received, the integrated controller outputs the motor driving signal for position setting to the electric motor so as to move the camera step by step from the current position on the A-pillar.

6. The driver status warning system of claim 1, wherein the camera assembly further comprises a camera seating member having one side on which the camera is seated, the camera seating member being configured to be linearly moved along a surface of the screw bar by the rotation of the screw bar,
wherein as the camera seating member is moved linearly along the surface of the screw bar in a state in which the camera is seated thereon, the camera is moved upward or downward on the A-pillar.

7. A method of monitoring a driver's state by a driver status warning system including a camera assembly, which is embedded in an A-pillar of a vehicle and includes an electric motor, a screw bar configured to be rotated by a rotational force of the electric motor, and a camera configured to be moved upward or downward on the A-pillar by the rotation of the screw bar, the method comprising:
determining, by an integrated controller, whether camera position data is stored in a memory according to a start-on signal;
when the camera position data is stored in the memory, controlling, by the integrated controller, the electric motor to move the camera to a position on the A-pillar corresponding to the camera position data; and
analyzing, by a facial recognition module, an image of a driver's face captured at the position to which the camera is moved so as to monitor the driver's condition.

8. The method of claim 7, further comprising:
when the camera position data is not stored in the memory, performing, by the facial recognition module, facial recognition on an image of the driver's face captured by the camera at a current position of the camera on the A-pillar; and
when the facial recognition is successful, writing, by the integrated controller, the camera position data corresponding to the current position of the camera to the memory.

9. The method of claim 7, wherein the camera position data comprises data corresponding to the driver's height when seated.

10. A driver status warning system comprising:
a memory configured to store camera position data;
an integrated controller configured to generate a motor driving signal corresponding to the camera position data;
a camera assembly embedded in an A-pillar of a vehicle, wherein the camera assembly comprises: an electric motor configured to generate a rotational force according to the motor driving signal; a belt configured to be rotated by the rotational force; and a camera configured to be moved upward or downward on the A-pillar by the rotation of the belt; and
a facial recognition module configured to analyze an image of a driver's face captured by the camera to sense the driver's condition.

11. The driver status warning system of claim 10, wherein the camera position data stored in the memory comprises data corresponding to the driver's height when seated.

12. The driver status warning system of claim 10, wherein, when result data indicating success of facial recognition for an image of the driver's face captured at a current position of the camera on the A-pillar from the facial recognition module is received, the integrated controller writes the camera position data corresponding to the current position on the A-pillar to the memory.

13. The driver status warning system of claim 10, wherein, when result data indicating failure of facial recognition for an image of the driver's face captured at a current position of the camera on the A-pillar from the facial recognition module is received, the integrated controller outputs the motor driving signal for position setting to the electric motor so as to move the camera step by step from the current position on the A-pillar.

14. The driver status warning system of claim 10, wherein the camera assembly further comprises:
a motor reducer connected to a rotation shaft of the electric motor;
a helical gear which is gear-coupled to the motor reducer to be rotated by the rotational force transmitted through the motor reducer;
a fixed gear disposed a certain distance from the helical gear; and
a camera seating plate on which the camera is seated and connected to both ends of the belt to be moved linearly by the rotation of the belt,
wherein the camera is seated on the camera seating plate, and
the belt is rotated by the helical gear and the fixed gear.

15. A method of monitoring a driver's state by a driver status warning system including a camera assembly, which is embedded in an A-pillar of a vehicle and includes an electric motor configured to generate a rotational force according to a motor driving signal, a belt configured to be rotated by the rotational force, and a camera configured to be moved upward or downward on the A-pillar by the rotation of the belt, the method comprising:
controlling, by an integrated controller, the electric motor according to camera position data stored in a memory to move the camera to a position on the A-pillar corresponding to the camera position data; and
analyzing, by a facial recognition module, an image of a driver's face captured at the position to which the camera is moved so as to monitor the driver's condition.

16. The method of claim 15, further comprising:
when the camera position data is not stored in the memory, performing, by the facial recognition module, facial recognition on an image of the driver's face captured by the camera at a current position of the camera on the A-pillar; and
when the facial recognition is successful, writing, by the integrated controller, the camera position data corresponding to the current position of the camera to the memory.

\* \* \* \* \*